US008031964B2

(12) United States Patent
Borel et al.

(10) Patent No.: US 8,031,964 B2
(45) Date of Patent: Oct. 4, 2011

(54) DISPLAY METHOD AND DEVICE FOR REDUCING BLURRING EFFECTS

(75) Inventors: Thierry Borel, Beijing (CN); Didier Doyen, La Bouexiere (FR)

(73) Assignee: Thomson Licensing, Boulogne-Billancourt (FR)

( * ) Notice: Subject to any disclaimer, the term of this patent is extended or adjusted under 35 U.S.C. 154(b) by 989 days.

(21) Appl. No.: 11/794,859

(22) PCT Filed: Dec. 13, 2005

(86) PCT No.: PCT/EP2005/056719

§ 371 (c)(1),
(2), (4) Date: Nov. 16, 2007

(87) PCT Pub. No.: WO2006/072537

PCT Pub. Date: Jul. 13, 2006

(65) Prior Publication Data

US 2008/0131017 A1 Jun. 5, 2008

(30) Foreign Application Priority Data

Jan. 6, 2005 (FR) ...................................... 05 50040

(51) Int. Cl.
*G06K 9/40* (2006.01)
*G06F 3/038* (2006.01)
*G09G 3/36* (2006.01)

(52) U.S. Cl. ......................... 382/266; 345/204; 345/100

(58) Field of Classification Search ........................ None
See application file for complete search history.

(56) References Cited

U.S. PATENT DOCUMENTS 4,921,334 A * 5/1990 Akodes ........................... 345/89
5,056,154 A * 10/1991 Aono et al. ................... 382/246
5,561,476 A * 10/1996 Kershaw et al. .............. 348/699
5,774,101 A * 6/1998 Hirai et al. ...................... 345/89
(Continued)

FOREIGN PATENT DOCUMENTS

EP 1162571 12/2001
(Continued)

OTHER PUBLICATIONS

D.Doyen et al: "Compensation of False Contours on a PDP Using a Pixel Based Motion Estimator Combined With an Efficient Coding Technique", 2003 SID Int'l Symposium Digest of Technical Papers, Baltimore, MD May 20-22, 2003, vol. 34/2, May 20, 2003, pp. 780-783.

(Continued)

*Primary Examiner* — Bhavesh Mehta
*Assistant Examiner* — Michelle Entezari
(74) *Attorney, Agent, or Firm* — Robert D. Shedd; Jeffrey M. Navon

(57) ABSTRACT

The present invention relates to a display method and device for improving the luminous efficiency of a matrix display using a pulse-width modulation, or PWM, technique. According to the invention, in order to reduce the blurring effect, the display method comprises the following steps: —detecting the moving object contours within said sequence of video images, —modifying, for each image of said sequence and each contour detected, the gray level of at least one pixel adjacent to said contour by assigning to it an intermediate level in the range between its initial gray level and that of the other pixel adjacent to said contour, and—displaying said modified image sequence. Application to matrix displays comprising a LCOS, OLED or DMD valve array.

11 Claims, 11 Drawing Sheets

U.S. PATENT DOCUMENTS

| | | | | |
|---|---|---|---|---|
| 6,661,470 | B1 * | 12/2003 | Kawamura et al. | 348/699 |
| 7,019,764 | B2 * | 3/2006 | Neal | 345/698 |
| 7,643,019 | B2 * | 1/2010 | Velthoven et al. | 345/204 |
| 7,764,839 | B2 * | 7/2010 | Abe | 382/199 |
| 2001/0005191 | A1 * | 6/2001 | Doyen et al. | 345/63 |
| 2005/0057455 | A1 * | 3/2005 | Peng | 345/76 |
| 2005/0147277 | A1 * | 7/2005 | Higaki et al. | 382/103 |

FOREIGN PATENT DOCUMENTS

| | | |
|---|---|---|
| EP | 1406236 | 4/2004 |

OTHER PUBLICATIONS

Search Report Dated May 5, 2006.

* cited by examiner

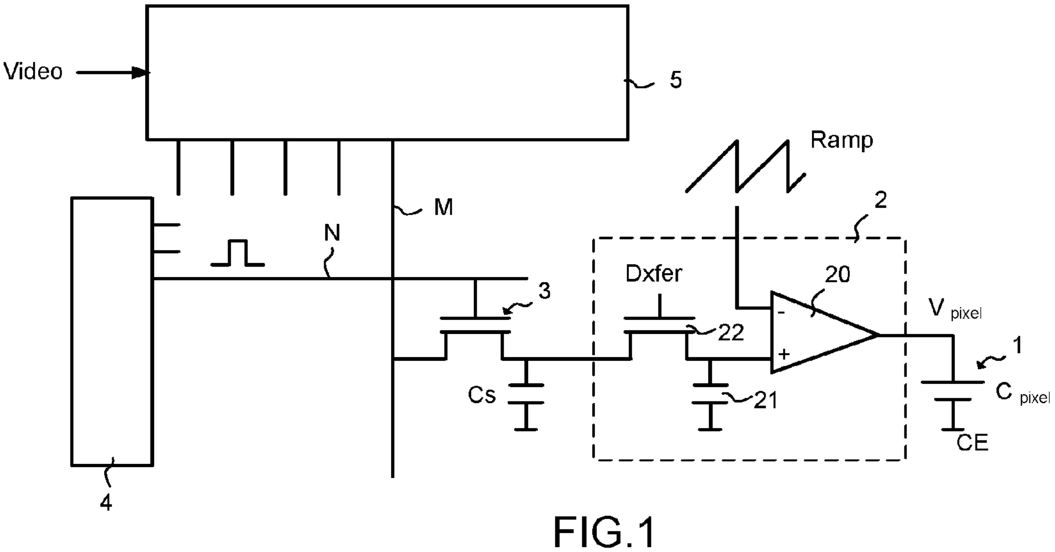
FIG.1
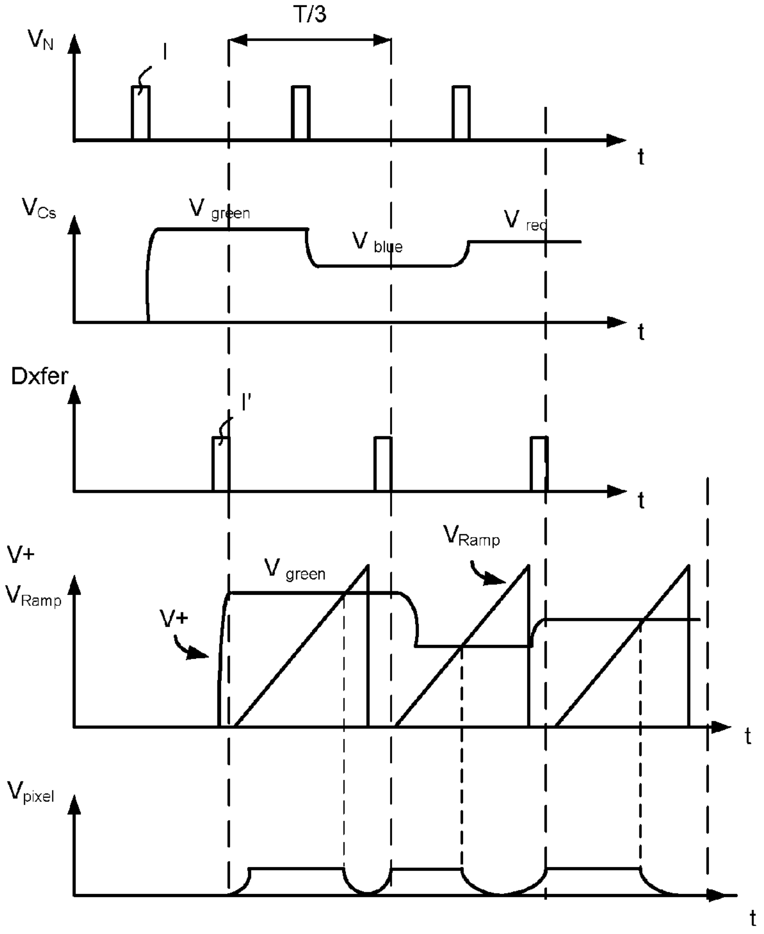
FIG.2a
FIG.2b
FIG.2c
FIG.2d
FIG.2e

DISPLAY METHOD AND DEVICE FOR REDUCING BLURRING EFFECTS

This application claims the benefit, under 35 U.S.C. §365 of International Application PCT/EP2005/056719, filed Dec. 13, 2005, which was published in accordance with PCT Article 21(2) on Jul. 13, 2006 in English and which claims the benefit of French patent application No.0550040, filed Jan. 6, 2005.

The present invention relates to a display method and device for improving the luminous efficiency of a matrix display using a pulse-width modulation, or PWM, technique. It relates, in particular, to the matrix displays in which the electro-optical valve array is formed by a liquid crystal valve array, more particularly a valve array of the LCOS, for 'Liquid Crystal on Silicon', type or a valve array of the OLED, for 'Organic Light Emitting Diode or Display', type.

The invention will be more particularly described in relation to a color sequential display comprising a LCOS electro-optical valve array without this implying any limitation of the scope of the invention to this type of display.

Liquid crystal displays, or LCDs, used in direct viewing or projection displays are based on a matrix layout with an active element within each pixel. Various addressing methods are used for generating the gray levels corresponding to the luminance to be displayed within each pixel selected. The most conventional method is an analog method according to which the active element is switched during a line period in order to transfer the analog value of the video onto the capacitance of the pixel. In this case, the liquid crystal material orients itself in a direction that depends on the value of the voltage stored in the capacitance of the pixel. The polarization of the entering light is then modified and analyzed by a polarizer so as to create the gray levels. One of the problems of this method comes from the response time of the liquid crystal which depends on the gray levels to be generated.

In order to overcome this kind of drawback, a method for controlling a matrix display using a pulse-width modulation, or PWM, technique, has been proposed in the prior art and notably in the U.S. Pat. No. 6,239,780. In this case, the pixels of the liquid crystal display are addressed in ON or OFF mode, the ON mode corresponding to the saturation of the liquid crystal. The gray levels are determined by the width of the pulse. With such an addressing method, the dynamic range of the display is improved since the transition times now only represent a small proportion of the total opening time of the liquid crystal cell whatever the value of the luminance.

This addressing method is particularly advantageous when it is used to control the electro-optical valve array of a matrix display with sequential display of the colors in which the electro-optical valve array is successively illuminated with red, green and blue colored filters disposed on a colored wheel whose rotation is synchronized to the video signal. Since ON or OFF mode is used, this method benefits from a faster response time which is constant whatever the gray level that needs to be generated.

FIG. 1 shows the circuit diagram of a color sequential matrix display implementing this addressing method. This matrix display comprises an electro-optical valve array, more particularly a display of the LCOS type. In FIG. 1, an image dot, or pixel, 1 of the display screen is shown very schematically. This pixel 1 is symbolized by a capacitor Cpixel connected between the counter-electrode CE and the output of a voltage-time converter 2 allowing the pulse-width modulation, or PWM, to be implemented.

The voltage-time converter 2 comprises an operational amplifier 20 whose negative input receives a signal Ramp having the form of a rising ramp with a period equal to T/3 (or T/6 or T/9 in order to reduce the effects of color break up, T being the image period) and whose other input receives a positive voltage corresponding to the charge of a capacitor 21. The charge of the capacitor 21 is controlled by a switching system, more particularly a transistor 22 mounted between one electrode of the capacitor and the input of the voltage-time converter. This switching device is formed by a transistor whose gate receives a pulse referenced Dxfer.

As shown in FIG. 1, the image dot, or pixel, 1 is connected to a row N and a column M of the matrix by means of a switching circuit such as a transistor 3. More specifically, the gate of the transistor 3 is connected to a row N of the matrix, which is itself connected to a row driver circuit 4. Furthermore, one of the electrodes of the transistor, for example the source, is connected to the input of the voltage-time converter 2, whereas the other electrode, for example the drain, is connected to one of the columns M of the matrix, this column being connected to a column driver circuit 5 which receives the video signal to be displayed. In addition, a capacitor Cs is mounted in parallel with the pixel capacitor at the input of the voltage-time converter in order to store the video signal value when said pixel is selected. The column driver circuit 5 and row driver circuit 4 are conventional circuits. The column driver circuit 5 receives the video signal to be displayed 'Video' and the row driver circuit 4 allows the rows to be addressed sequentially.

With reference to FIGS. 2*a* to 2*e*, the mode of operation of the display will be explained when it is used in a color sequential display, namely when, over a frame period T, a wheel carrying three color filters, green, blue and red, makes one complete rotation to produce a sequential illumination of the valve array.

As shown in FIG. 2*a*, a pulse I is applied during each sub-frame of duration T/3 to the row N so as to turn on the switching transistor 3. When the switching transistor 3 is turned on, the capacitor Cs charges up to a voltage corresponding to the video present on the column M. Namely, if a green colored filter is located in front of the display during the first sub-frame of duration T/3, the capacitor Cs charges up to a value referenced $V_{green}$ in FIG. 2*b*. During the following sub-frame, a new pulse I is applied to the row N allowing the capacitor Cs to charge up to a voltage referenced $V_{blue}$ corresponding to the blue color being located in front of the display at that time. Similarly, at the start of the next sub-frame, a new pulse I is applied to the row N and the capacitor Cs charges up to a voltage referenced $V_{red}$ in FIG. 2*b*. With the display in FIG. 1 controlled by a PWM addressing method, the values $V_{green}$, $V_{blue}$ and $V_{red}$ successively stored in the capacitor Cs are applied to the capacitor $C_{pixel}$ by means of the voltage-time converter 2 which operates in the following manner.

A pulse I' is applied within a sub-frame to the gate Dxfer of the switching transistor 22 so as to turn it on. The voltage stored in the capacitor Cs is then transferred onto the capacitor 21 mounted in parallel and connected to one of the input terminals of the operational amplifier 20. As shown in FIG. 2*d*, at the end of the pulse I' applied to the gate Dxfer, the signal Ramp is applied to the negative input of the operational amplifier 20. Consequently, at the output of the operational amplifier 20, a voltage pulse $V_{pixel}$ is obtained whose duration is proportional to the voltage $V_{green}$ stored on the capacitor 21, as shown in FIGS. 2*d* and 2*e*. The same is true for the sub-frames corresponding to the passages of the blue and red colored filters in the case where the display in FIG. 1 is used for a sequential display of the colors.

Although this method has the advantage of improving the response time of the liquid crystal and of thus obtaining an optimal color saturation for the video content, the luminous efficiency is however affected by a 'blurring effect' when images comprising moving objects are displayed. This blurring effect is present on the contours of objects in the displayed images. It is not visible in the static images or the images whose content changes with a much lower frequency than the screen refresh frequency.

This blurring effect is illustrated by FIGS. 3A to 3C in the case of a transition between a maximum gray level of 255 and a minimum gray level of 0 and by FIGS. 4A to 4C in the case of a transition between two unsaturated gray levels, namely a gray level of 192 and a gray level of 64. These transitions correspond to contours of objects. In the following part of the description, the presence of a level 0 next to a level 255 on two adjacent pixels belonging to the same row will be denoted as black/white or white/black transition, even if the level 255 actually represents a saturated red, a saturated green or a saturated blue.

In the upper part of these figures, the ordinate axis represents the time axis and the abscissa axis the image pixels.

In FIG. 3A, the white/black transition is static, i.e. it does not move between the two displayed video frames, N and N+1. In FIG. 3B, it moves by 2 pixels toward the left between the two video frames and in FIG. 3C, it moves by 2 pixels toward the right. During the display of these two frames, the eye integrates the gray levels over time following the oblique arrows shown in the figures since it tends to follow the motion of the transition. The eye then perceives gray levels such as are shown in the lower part of the figures. It will thus be noted that, when the transition is moving between the two frames, the eye sees a blurred band, with a width of about 2 pixels in the present case, around this transition.

This defect is also present in the case of FIGS. 4A to 4C which illustrate the case of a transition between a gray level of 192 and a gray level of 64. In FIG. 4A, the transition is static; in FIG. 4B, it moves by 2 pixels toward the left between the two video frames and in FIG. 4C, it moves by 2 pixels toward the right. The width of the blurred band depends on the difference between the gray levels of the pixels adjacent to the transition and on the amplitude of the motion.

As a remedy for this defect, a known solution is to double the frequency of the video frames. This solution is illustrated in FIGS. 5A to 5C in the case of a white/black transition. It consists in generating, for each pair of images in the sequence to be displayed, an intermediate image which would be motion compensated and in displaying it between the two corresponding frames. For this purpose, the duration of the frames is divided by 2. For example, the frame N is divided into a sub-frame N and a sub-frame N+1/2 of durations equal to half the duration of the frame N in FIGS. 3A to 3C. Similarly, the frame N+1 is divided into a sub-frame N+1 and a sub-frame N+3/2. The images previously displayed during the frames N and N+1 are now displayed during the sub-frames N and N+1 and motion-compensated intermediate images are displayed during the sub-frames N+1/2 and N+3/2. The width of the blurred band is now reduced. However, this solution requires the image frequency to be multiplied by 2, which makes the construction of the display and of the row and column driver circuits of the electro-optical valve array very complex.

The present invention provides a different solution for reducing this blurring effect, which does not require a doubling of the image frequency.

The present invention relates to a method for displaying a video image sequence in a matrix display in which the display time of an image pixel is proportional to the gray level to be displayed, the method being characterized in that it comprises the following steps:

- detecting the moving object contours within the sequence of video images,
- modifying, for each image of the sequence and each contour detected, the gray level of at least one of the pixels adjacent to the contour by assigning to it an intermediate level in the range between its initial gray level and that of the other pixel adjacent to the contour in question, and
- displaying said modified image sequence.

Advantageously, the gray level of the pixels of a group of consecutive pixels encompassing the contour in question is modified and they are assigned an intermediate level in the range between the initial gray levels of the pixels adjacent to the contour.

The intermediate level applied to the pixels of the group is calculated as a function of the initial gray levels of the pixels adjacent to the contour.

Advantageously, the method also comprises a step for calculating the motion of each contour detected, the intermediate level then being calculated as a function of the amplitude of the motion detected for said contour. The number of pixels of the group of pixels is advantageously also determined as a function of the amplitude of the calculated motion for the contour in question.

The images thus modified can then be displayed in several ways. According to a first embodiment, the intermediate gray level of the modified pixels is displayed at the start or at the end of the image display frame depending on the motion detected for this contour and on the difference, positive or negative, between the initial gray levels of the pair of pixels adjacent to the contour.

According to a second embodiment, the display phase of the gray level of the image pixels is centered in the middle of the image display frame.

The invention also relates to a device for displaying a sequence of video images comprising a matrix of illuminating cells designed to display the gray level of the image pixels of said sequence, means for controlling said matrix in order to illuminate each of the cells for a duration that is proportional to the gray level of the corresponding image pixel to be displayed, characterized in that it additionally comprises

- first means for detecting the moving object contours within said sequence of video images,
- second means for modifying, for each image of the sequence and each contour detected, the gray level of at least one of the pixels adjacent to the contour by assigning to it an intermediate level in the range between its initial gray level and that of the other pixel adjacent to the contour in question, said modified sequence being delivered to said means for controlling said matrix.

The invention is just as applicable to color sequential systems as to color non-sequential systems.

The invention will be better understood upon reading the description that follows, presented by way of non-limiting example and with reference to the appended drawings, in which:

FIG. 1, already described above, is a schematic representation of a matrix display controlled by an addressing method of the pulse-width modulation, or PWM, type;

FIGS. 2*a* to 2*e*, already described above, show the various control signals and the output signal of the display in FIG. 1 for the case of a color sequential display;

FIGS. 3A to 3C, already described above, show the display defects generated by such an addressing method in the case of a white/black transition;

FIGS. 4A to 4C, already described above, show the display defects generated by such an addressing method in the case of a transition between two unsaturated gray levels;

FIGS. 5A to 5C, already described above, illustrate a solution from the prior art for reducing these defects;

Figure 9:
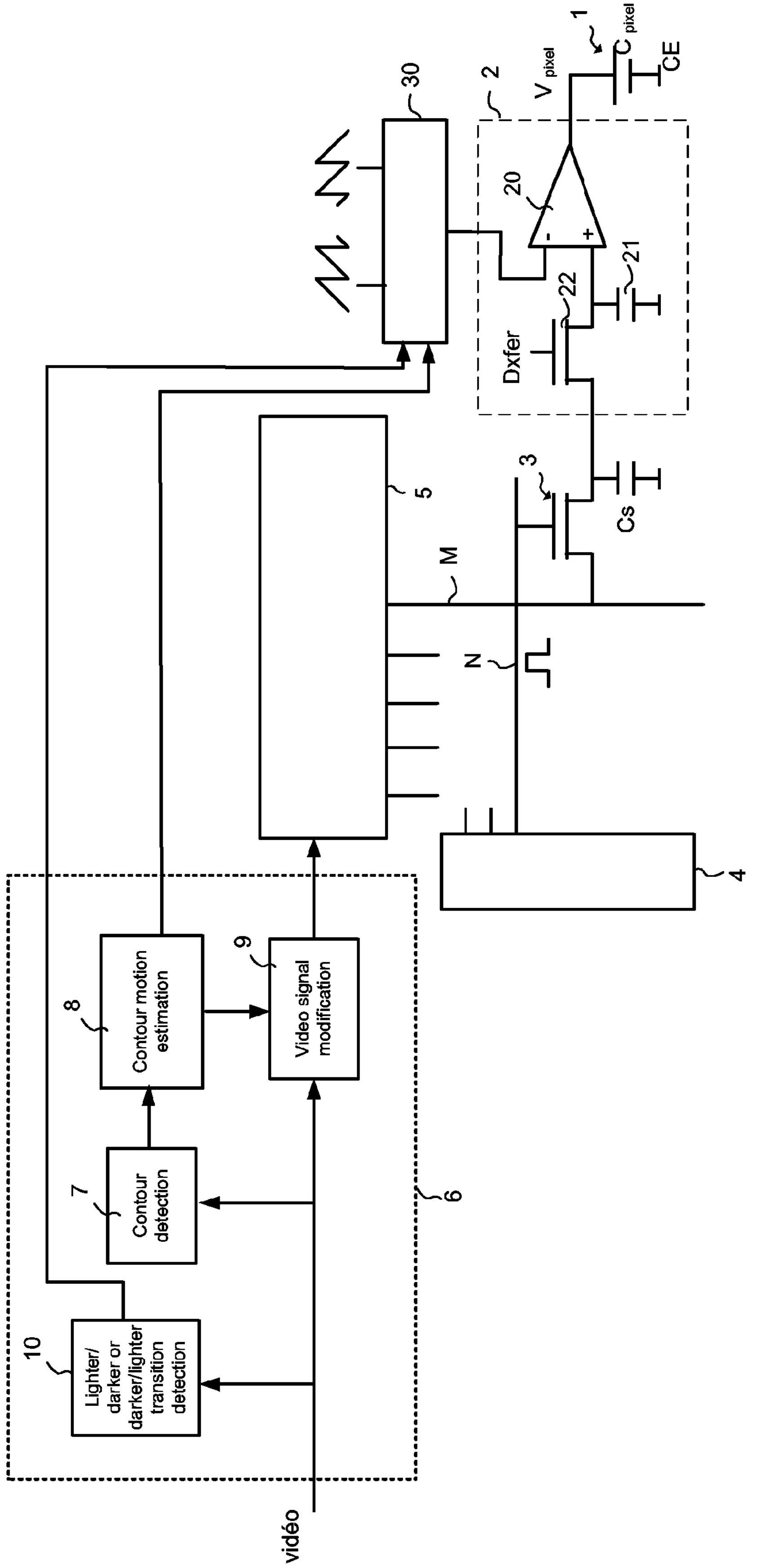
FIG. 9 is a circuit diagram of a display device implementing the embodiment in FIGS. 8A to 8C.
Figures 10A, 10B, 10C, 10D, 10E:
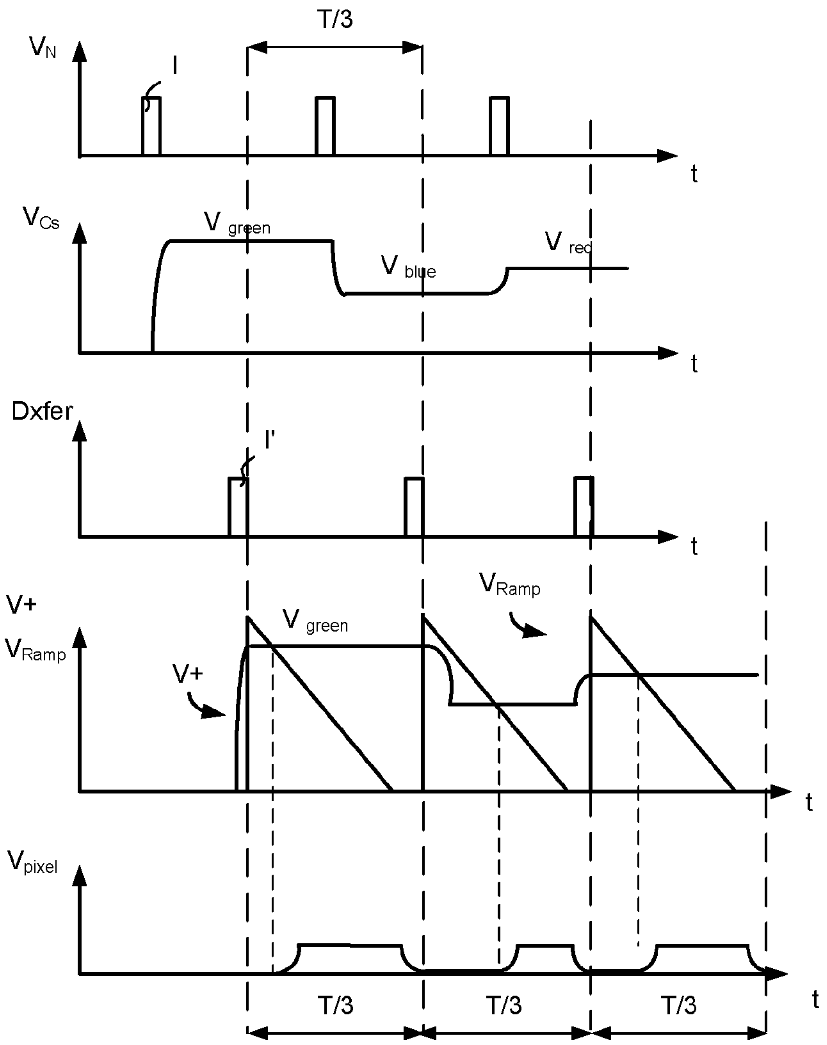
Figures 11A, 11B, 11C:
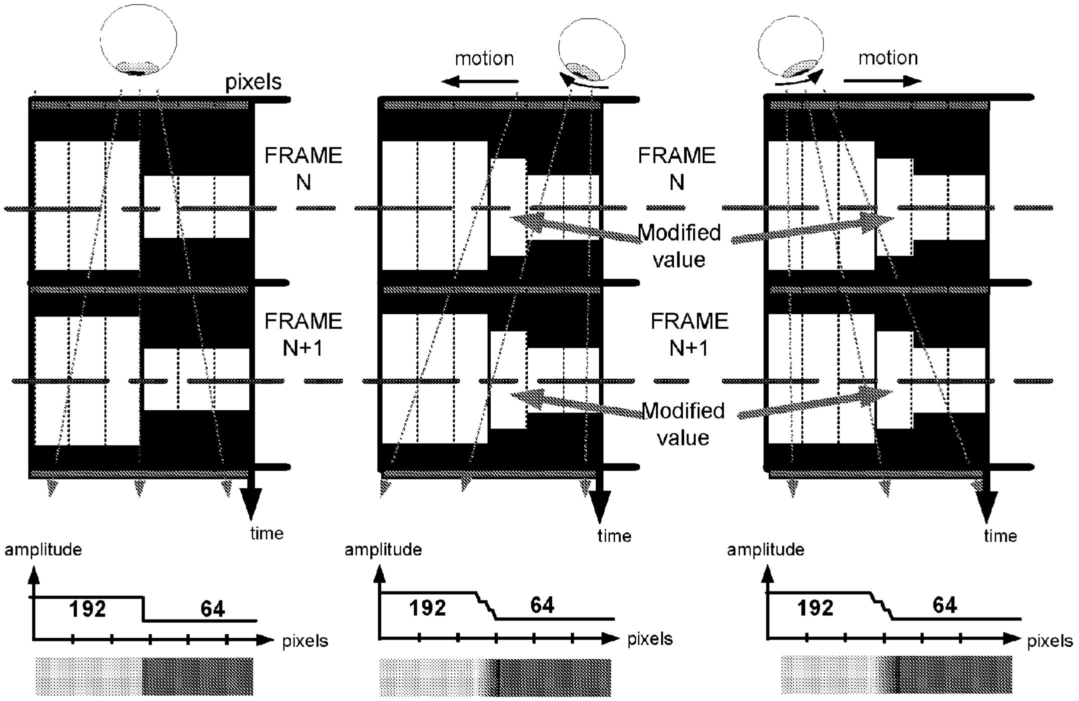
Figure 12:
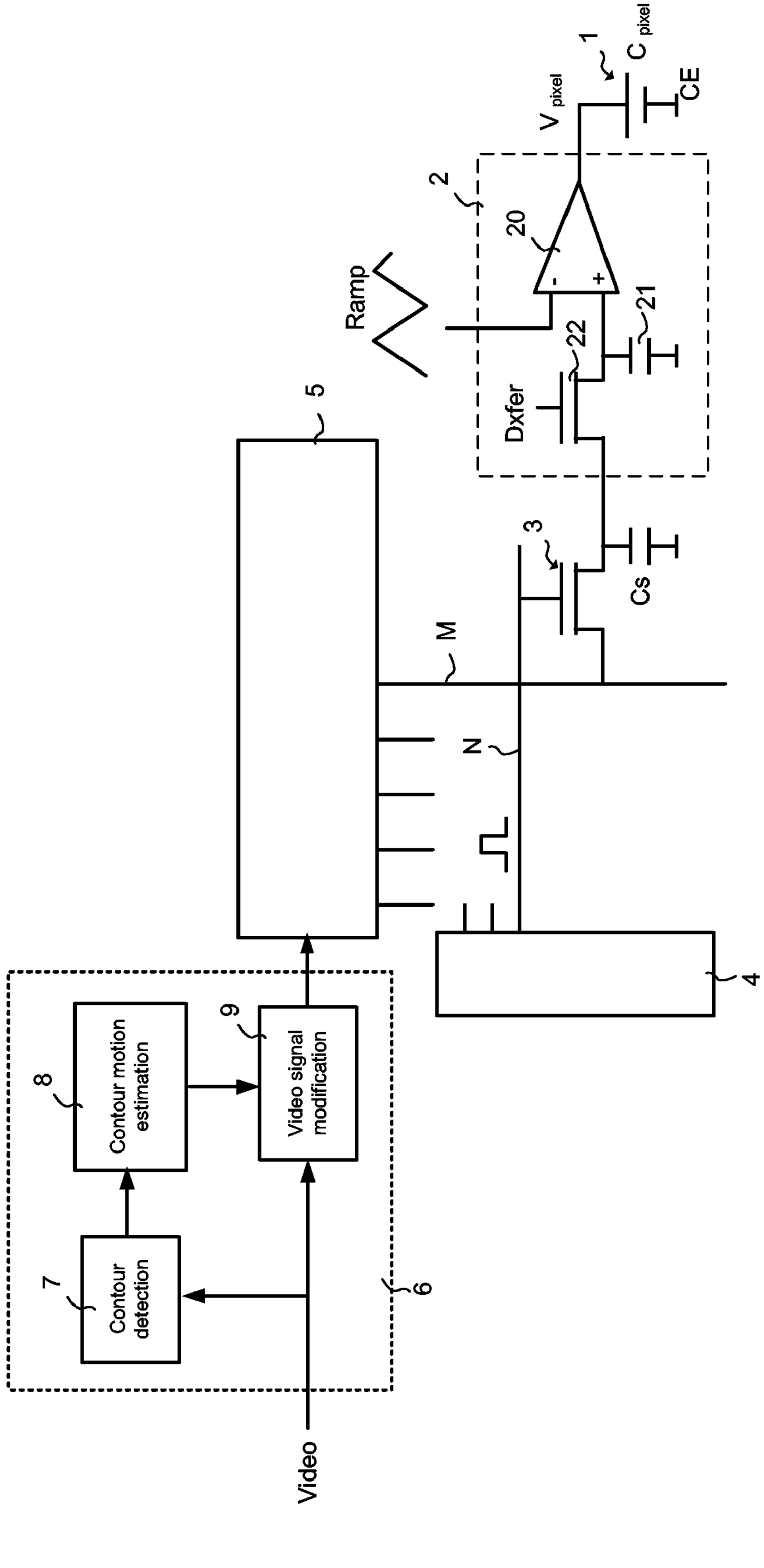
Figures 13A, 13B, 13C, 13D, 13E:
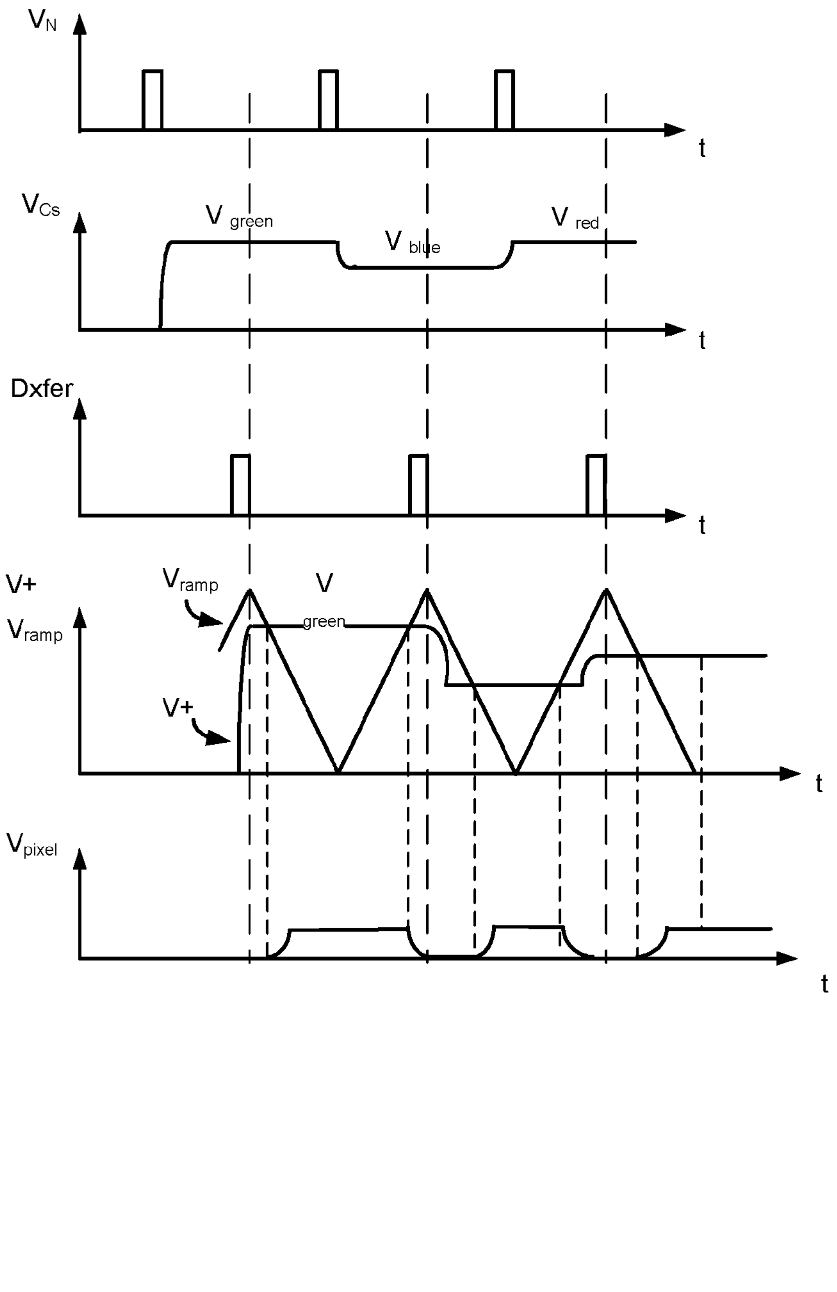

FIGS. 10*a* to 10*e* show the various control signals and the output signal of the device in FIG. 9 for the case of a color sequential display;

FIGS. 11A to 11C illustrate a preferred embodiment of the method of the invention that is applicable to all the types of transition detected;

FIG. 12 is a circuit diagram of a display device implementing the embodiment in FIGS. 11A to 11C, and FIGS. 13*a* to 13*e* show the various control signals and the output signal of the device in FIG. 12 in the case of a color sequential display.

According to the invention, the object is to detect the contours of objects in motion within the sequence of images to be processed, to modify, for each image of said sequence and each contour detected, the gray level of at least one pixel adjacent to said contour by assigning to it an intermediate level in the range between its initial gray level and that of the other pixel adjacent to said contour and, lastly, to display the images thus modified in PWM mode.

Preferably, the gray levels of the pixels from a group of consecutive pixels encompassing the contour in question are modified and they are assigned an intermediate level in the range between the initial gray levels of the pixels adjacent to said contour.

The intermediate levels assigned to the pixels of the group are calculated as a function of the initial gray levels of the pixels adjacent to the contour in question and, advantageously, as a function of the amplitude of the motion detected for the contour in question.

Furthermore, the number of pixels in the group of pixels is advantageously also calculated as a function of the amplitude of the motion detected for the contour in question.

The detection of contours and the estimation of motion of the contours detected are carried out in a conventional manner using conventional means that are well known to those skilled in the art.

The invention will be more particularly described by way of examples in which the video level of a single pixel adjacent to a contour is modified. In these examples, the intermediate level assigned to this pixel is taken to be equal to the arithmetic mean of the initial gray levels of the pixels adjacent to the contour.

Figure 3A:
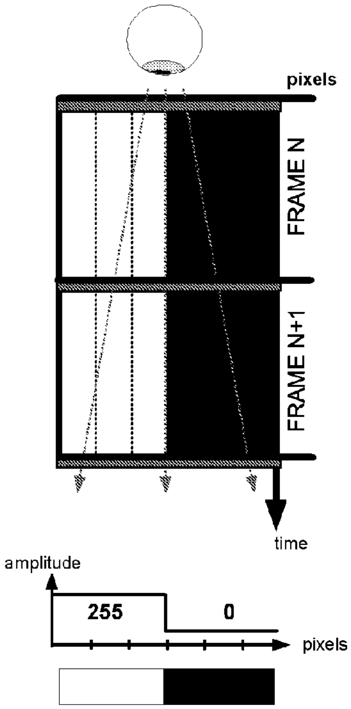
Figure 3B:
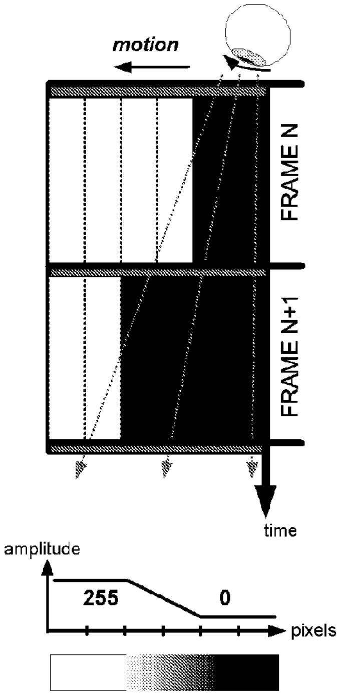
Figure 3C:
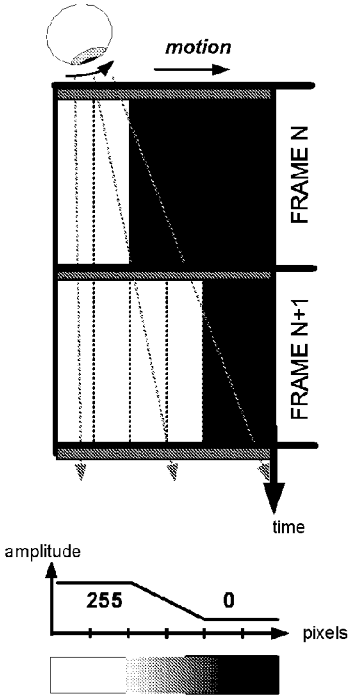
Figures 4A, 4B, 4C:
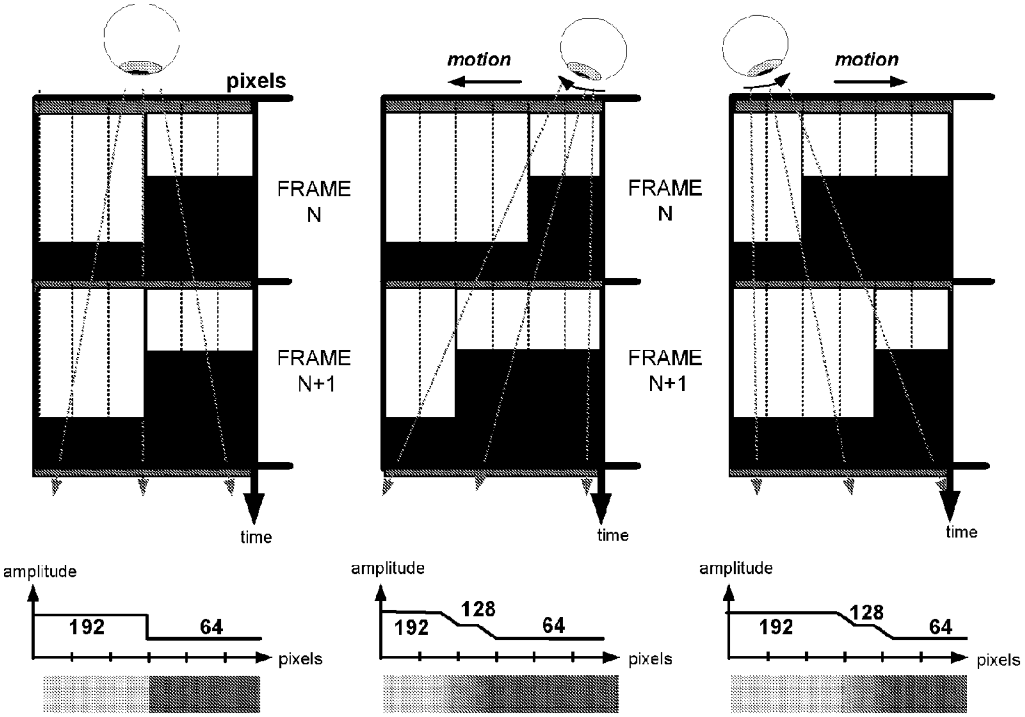
Figure 5A:
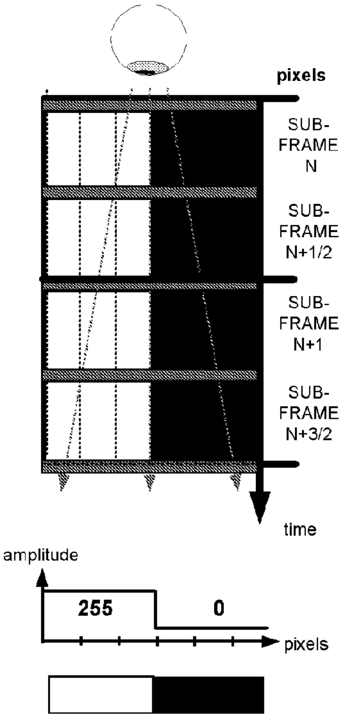
Figure 5B:
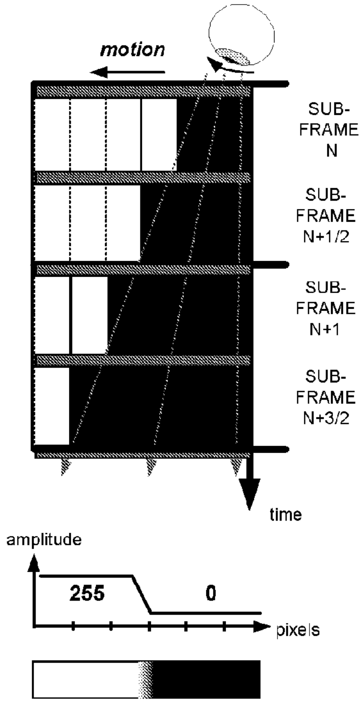
Figure 5C:
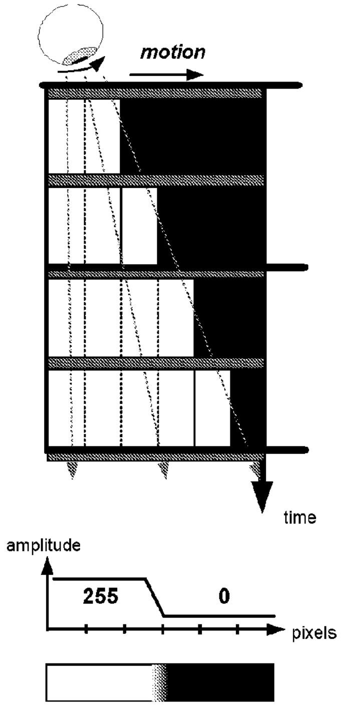
Figures 6A, 6B, 6C:
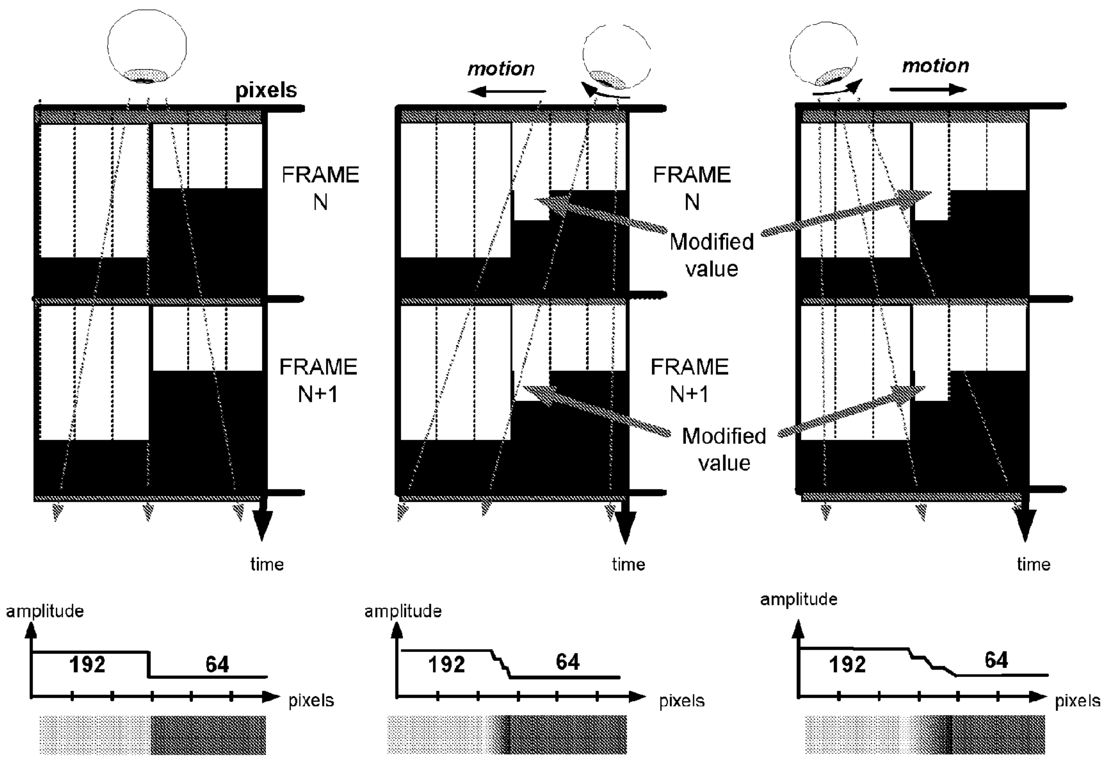
FIGS. 6A to 6C illustrate a first embodiment of the method of the invention in the case of a transition between two unsaturated gray levels.

FIGS. 6A to 6C illustrate a first example implementing the method of the invention. These figures relate to the case of a transition between a gray level of 192 ($3^{rd}$ pixel starting from the left) and a gray level of 64 ($4^{th}$ pixel starting from the left). These figures are to be compared with FIGS. 4A to 4C showing the same transition.

In this example, only the gray level of one of the two pixels adjacent to the contour (namely the gray level of the $4^{th}$ pixel) is modified and is brought to an intermediate value of 128, in the range between 64 and 192, representing the arithmetic mean of these two values. In this way, when the contour moves, the blurring effect perceived by the eye (after integration in the direction of the arrows) is reduced in width as can be seen in the lower part of FIGS. 6B and 6C. Of course, it would be equally possible to modify the gray level of the $3^{rd}$ pixel instead of the $4^{th}$ pixel, or even to modify the gray levels of the $3^{rd}$ and $4^{th}$ pixels. In this second case, the intermediate level of the $3^{rd}$ pixel would also be in the range between 64 and 192 and would be taken to be greater than that of the $4^{th}$ pixel.

More generally, the number of pixels whose video level is modified depends on the amplitude of the contour motion. The higher the amplitude of the motion, the greater the number of pixels whose video level is modified. Similarly, the amplitude of the contour motion is advantageously taken into account in the calculation of the intermediate level or levels relating to this contour.

The case of a transition situated between two consecutive pixels P(x,y) and P(x+1,y) is taken. NG[P(x,y)] furthermore denotes the gray level of the pixel P(x,y). If D is the level difference in the horizontal direction between two consecutive pixels, then D=P(x,y)−P(x+1,y). Furthermore, Vx and Vy respectively denote the motion vectors obtained locally in the horizontal direction and the vertical direction at the location of the transition.

According to a particular embodiment of the invention, the gray level of the pixels in the range:

$x_{min}$=TRUNC (x−1/2Vx)+1 and $x_{max}$=TRUNC (x+1/2Vx) is modified, where TRUNC corresponds to an operation to truncate to an integer value.

The gray level assigned to the pixels in the range between $x_{min}$ and $x_{max}$ is for example defined as a function of its separation with one of the pixels P($x_{min}$,y) and P($x_{max}$,y):

$$\begin{cases} NG[P(x_{min}, y)] = NG[P(x+1, y)] + D = NG[P(x, y)] \\ NG[P(x_{max}, y)] = NG[P(x+1, y)] = NG[P(x, y)] - D \end{cases}$$

and $$NG[P(x_i, y)] = \frac{NG[P(x_{max}, y)] \times (x_{max} - x_i + 1) * + D}{x_{max} - x_{min}}$$

The images thus modified are subsequently displayed according to the pulse-width modulation technique previously described.

It should be noted that the width of the transition is not identical in the two cases (motion toward the left and motion toward the right) illustrated by FIGS. 6B and 6C; it is however still reduced in both cases with respect to the prior art illustrated by FIGS. 4A to 4C.

Figure 7:
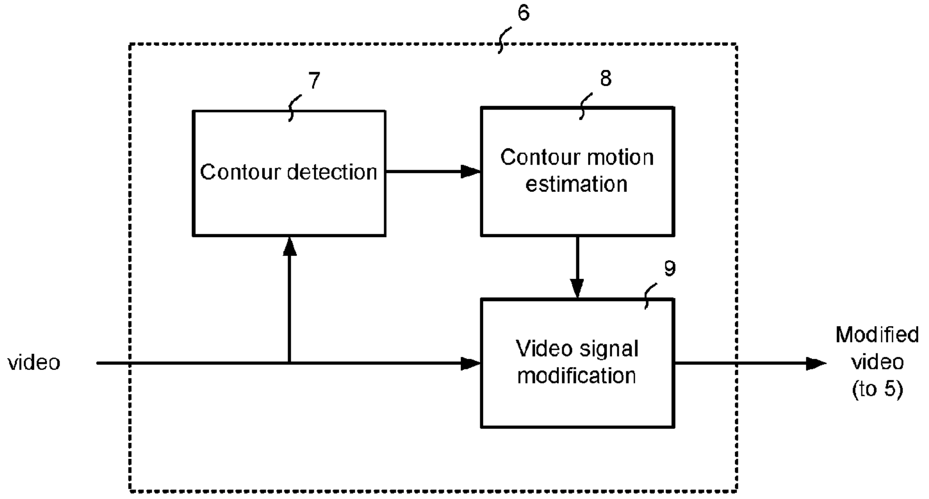
FIG. 7 is a circuit diagram in the form of circuit blocks for the implementation of the method of the invention.

The method of the invention can be readily implemented in a video processing circuit placed upstream of the column driver circuit 5 of the display in FIG. 1, the video levels generated being subsequently delivered to the column driver circuit 5. Such a circuit, referenced 6, is illustrated by FIG. 7. It comprises a contour detection circuit 7, a motion estimation circuit 8 for estimating the motion of the contours detected and a circuit 9 for modifying the video level of the pixels adjacent to the contours detected by assigning to them an intermediate level calculated as previously described. The image thus modified can then be displayed by a device such as that shown in FIG. 1.

Figure 8A:
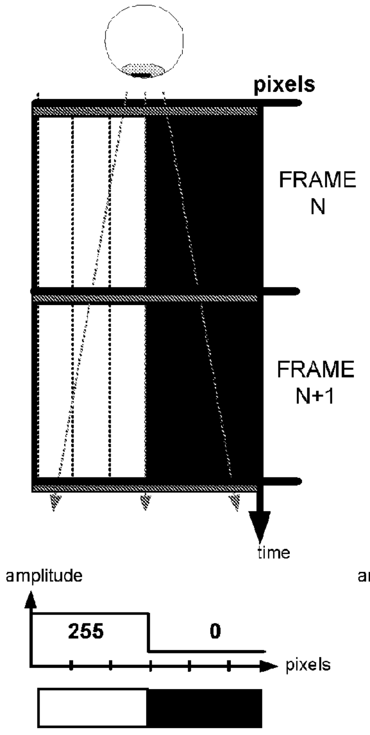
FIGS. 8A to 8C illustrate another embodiment of the method of the invention in the case of a white/black transition.
Figure 8B:
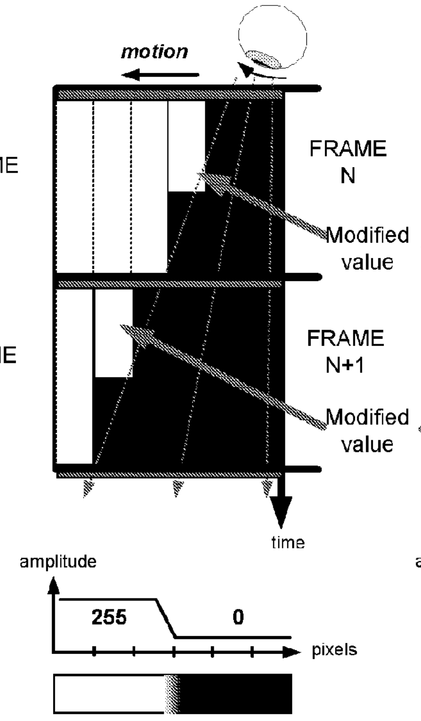
Figure 8C:
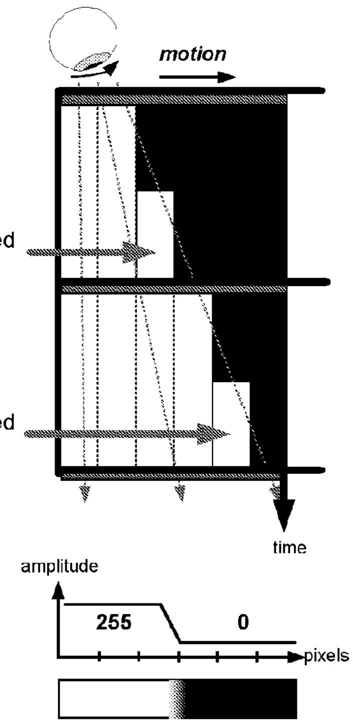

In the case of images comprising black/white or white/black transitions, the reduction of the blurring effects is not the same for a black/white transition and a white/black transition with a method such as that described above. An improved embodiment is therefore also provided in which the variable pulse widths used to display the gray levels of the image are positioned differently within the frame depending on the direction of motion of the contours and depending on the gray levels on either side of the contours. This new embodiment is illustrated by FIGS. 8A to 8C which relate to a white/black transition.

In this second embodiment, the intermediate gray levels are calculated as previously described. The intermediate level of one of the pixels adjacent to the white/black transition is therefore taken to be equal to 128. The modified video signal can be generated by a circuit such as is described in FIG. 7. In this embodiment, the display of the gray levels is however modified. The variable-width pulses are positioned differently within the frame or sub-frame (in the case of a color sequential display) depending on whether the transition is moving toward the left or toward the right and on whether the gray level increases or decreases in the course of this transition.

According to this embodiment, the variable-width pulses are positioned within the frame (or sub-frame in the case of a color sequential display) in the following manner:

- when the gray level increases in the course of the transition in a given direction, for example from left to right, and when the transition is moving toward the left, the pulses are positioned at the end of the frame;
- when the gray level increases in the course of the transition from left to right and when the transition is moving toward the right, the pulses are positioned at the start of the frame;
- when the gray level decreases in the course of the transition from left to right and when the transition is moving toward the left, the pulses are positioned at the start of the frame; and
- when the gray level decreases in the course of the transition from left to right and when the transition is moving toward the right, the pulses are positioned at the end of the frame.

In the example illustrated by FIGS. 8A to 8C, FIG. 8A shows a static white/black transition, FIG. 8B shows the same transition moving toward the left and FIG. 8C shows the same transition moving toward the right.

The pulses are placed at the start of the frame when the transition is moving toward the left and at the end of the frame when it is moving toward the right. A reduced blurred bandwidth is thus obtained for any given situation.

Such a display scenario implies that the structure of the matrix display, together with that of the processing block 6, be somewhat modified. FIG. 9 shows a display comparable to the display in FIG. 1 equipped with a processing block 6. This display differs from that in FIG. 1 in that it additionally comprises a selection block 30 designed to select, depending on the direction of movement of the transition and on the type of transition (lighter/darker or vice versa), either a rising voltage ramp (as described with reference to FIG. 1) or a falling voltage ramp. Furthermore, the processing block 6 differs from that in FIG. 7 in that it comprises a second detection circuit 10 for detecting the type of the transitions (lighter/darker or darker/lighter) in the images. This selection block 30 comprises four inputs: a first signal input receiving a rising voltage ramp, a second signal input receiving a falling voltage ramp, a first control input receiving a first control signal representing the direction of motion of the transition and a second control input receiving a second control signal representing the type of the transition. The first control signal is delivered by the motion estimation circuit 8 and the second control signal is delivered by the detection circuit 10. The output of the selection block 30 is connected to the negative input of the operational amplifier 20.

In this display, the direction, positive or negative, of the slope of the voltage ramp is selected depending on the detected motion of the contour in question and on the difference, positive or negative, between the gray levels either side of the contour. A positive slope denotes a rising voltage ramp and a negative slope denotes a falling voltage ramp.

In operation, the block 30 delivers the rising voltage ramp at its output when the contour (the transition) is moving toward the left and when this transition is a lighter/darker transition or when the contour is moving toward the right and when this transition is a darker/lighter transition. It delivers a falling voltage ramp when the contour is moving toward the left and when this transition is a darker/lighter transition or when the contour is moving toward the right and when this transition is a lighter/darker transition.

FIGS. 10*a* to 10*e*, to be compared with FIGS. 2*a* to 2*e*, illustrate the application of a falling voltage ramp to the negative input of the amplifier 20. The pulses at the output of the amplifier are generated at the end of the frame.

A final embodiment, corresponding to a preferred embodiment, is described with reference to FIGS. 11A to 11C, 12 and 13. In this embodiment, the PWM pulse employed for displaying the gray levels of the image pixels is positioned in the middle of the frame. This embodiment no longer requires that the type and direction of motion of the transition be detected.

FIGS. 11A to 11C show the positioning of the PWM pulses in the middle of the frame in the case of a transition 192-64. The intermediate levels are calculated as previously described. As is shown in the lower part of these figures, a reduction in the width of the blurred band is obtained that is at least equivalent to that obtained with the methods described with reference to FIGS. 6A to 6C or 8A to 8C.

In order to obtain such a display scenario in the case of a color sequential display, it suffices to apply a double voltage ramp of period T/3 comprising a rising portion and a falling portion of same duration, as shown in FIG. 12, to the negative input of the operational amplifier 20.

FIGS. 13*a* to 13*e* illustrate the application of a falling voltage ramp to the negative input of the amplifier 20. The pulses at the output of the amplifier are generated in the middle of the frame or close to it.

The invention claimed is:

1. A method for displaying a video image sequence in a matrix display in which the display time of an image pixel is proportional to the gray level to be displayed, said method comprising the following steps:

- detecting the moving object contours within said sequence of video images,
- modifying, for each image of said sequence and each contour detected, the gray level of at least one pixel adjacent to said contour by assigning to it an intermediate level in the range between its initial gray level and that of the other pixel adjacent to said contour, and
- displaying said modified image sequence, the intermediate gray level of a contour pixel being displayed at the start or at the end of a video frame, during which each image is displayed, depending on the direction of the motion detected for this contour and on the difference positive or negative between the initial gray levels of the pixels adjacent to the contour.

2. The method as claimed in claim 1, wherein the gray level of the pixels of a group of consecutive pixels encompassing the contour in question is modified and they are assigned an intermediate level in the range between the initial gray levels of the pixels adjacent to said contour.

3. The method as claimed in claim 1, wherein the intermediate level is calculated as a function of the initial gray levels of the pixels adjacent to the contour in question.

4. The method as claimed in claim 3, wherein it also comprises a step for calculating the motion of each contour detected, and in that the intermediate level is furthermore calculated as a function of the amplitude of the motion detected for said contour.

5. The method as claimed in claim 4, wherein the number of pixels of the group of consecutive pixels is determined as a function of the amplitude of the calculated motion for the contour in question.

6. A device for displaying a sequence of video images comprising a matrix of illuminating cells designed to display the gray level of the image pixels of said sequence, means for controlling said matrix in order to illuminate each of the cells for a duration that is proportional to the gray level of the corresponding image pixel to be displayed further comprising a first circuit for detecting the moving object contours within said sequence of video images, a second circuit for modifying, for each image of said sequence and each contour detected, the gray level of at least one pixel adjacent to said contour by assigning to it an intermediate level in the range between its initial gray level and that of the other pixel adjacent to said contour, said modified sequence being delivered to said means for controlling said matrix, and a selection block for selecting the direction of the slope, positive or negative, of a ramp signal, for a detected contour, according to the detected motion for said contour and the difference, positive or negative, between the initial gray levels of the pair of pixels adjacent to said contour.

7. The device as claimed in claim 6, wherein said second circuit modifies the gray level of the pixels of a group of consecutive pixels encompassing the contour in question and they are assigned an intermediate level in the range between the initial gray levels of the pixels adjacent to said contour.

8. The device as claimed in claim 6, wherein said second circuit comprises calculation means for calculating the intermediate level as a function of the initial gray levels of the pixels adjacent to the contour in question.

9. The device as claimed in claim 8, wherein it also comprises a third circuit for calculating the motion of each contour detected.

10. The device as claimed in claim 9, wherein said calculation means calculate the intermediate level as a function of the amplitude of the motion estimated for the corresponding contour.

11. The device as claimed in claim 6 to wherein the matrix control means comprise an operational amplifier whose output is connected to the cells of the matrix, the signal of the modified sequence and the voltage ramp signal being respectively applied to first and second inputs of said amplifier.

* * * * *